(12) United States Patent
Nagamoto (10) Patent No.: US 9,761,376 B2
(45) Date of Patent: Sep. 12, 2017

(54) MULTILAYER CERAMIC CAPACITOR (71) Applicant: Murata Manufacturing Co., Ltd., Nagaokakyo-shi, Kyoto-fu (JP)

(72) Inventor: Toshiki Nagamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 10 days.

(21) Appl. No.: 14/851,278

(22) Filed: Sep. 11, 2015

(65) Prior Publication Data
US 2016/0093442 A1    Mar. 31, 2016

(30) Foreign Application Priority Data
Sep. 25, 2014 (JP) ................................. 2014-195464

(51) Int. Cl.
*H01G 4/30* (2006.01)
*H01G 4/008* (2006.01)
*H01G 4/232* (2006.01)
*H01G 4/12* (2006.01)

(52) U.S. Cl.
CPC ............ *H01G 4/30* (2013.01); *H01G 4/0085* (2013.01); *H01G 4/2325* (2013.01); *H01G 4/12* (2013.01); *H01G 4/1227* (2013.01)

(58) Field of Classification Search
CPC ............ H01G 4/30; H01G 4/008; H01G 4/12; H01G 4/1227; H01G 4/228; H01G 4/35
See application file for complete search history.

(56) References Cited

U.S. PATENT DOCUMENTS

2011/0299221 A1* 12/2011 Higashi .................. H01C 1/142
361/305

FOREIGN PATENT DOCUMENTS

JP         10-284343 A     10/1998

* cited by examiner

*Primary Examiner* — Nguyen Ha
(74) *Attorney, Agent, or Firm* — Keating & Bennett, LLP (57) ABSTRACT In a multilayer ceramic capacitor in which an outer electrode is arranged on a ceramic element body to be electrically connected to an inner electrode, the outer electrode includes a metal electrode layer on the ceramic element body, and a conductive resin layer on the metal electrode layer. When a dielectric layer between a pair of the inner electrodes adjacent in a stacking direction among a plurality of the inner electrodes extending to one of a pair of end surfaces of the ceramic element body is an inter-electrode dielectric layer, a gap extends a direction connecting the adjacent inner electrodes sandwiching the inter-electrode dielectric layer at a position near or adjacent to at least the one of the end surfaces.

18 Claims, 8 Drawing Sheets

PRIOR ART

MULTILAYER CERAMIC CAPACITOR

BACKGROUND OF THE INVENTION

1. Field of the Invention

The present invention relates to multilayer ceramic capacitors, and more specifically relates to a multilayer ceramic capacitor including an outer electrode arranged on a ceramic element body including an inner electrode that is electrically connected to the outer electrode.

2. Description of the Related Art

One of representative multilayer ceramic electronic components is, for example, a multilayer ceramic capacitor disclosed in Japanese Unexamined Patent Application Publication No. 10-284343.

Figure 4:
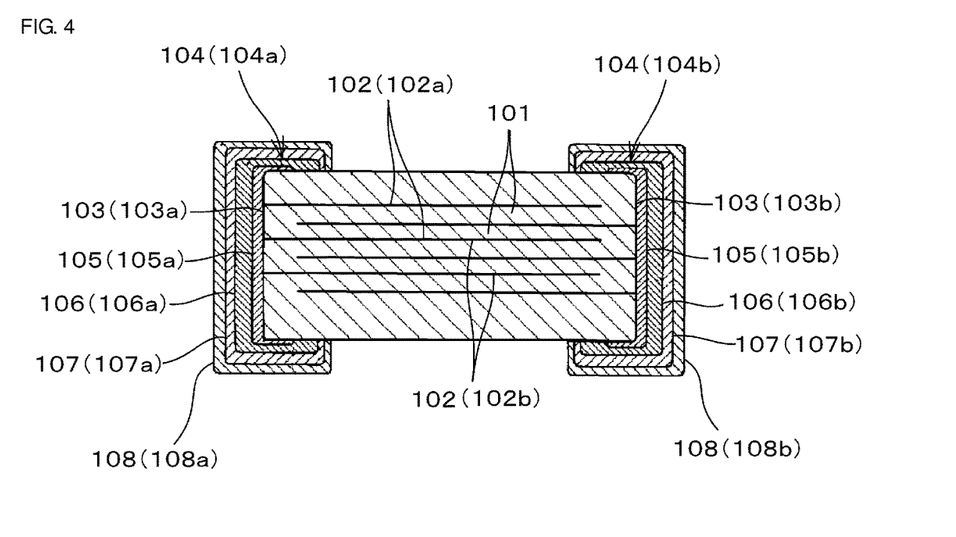
FIG. 4 is a front cross-sectional view showing a configuration of a multilayer ceramic capacitor according to related art.

As shown in FIG. 4, the multilayer ceramic capacitor has a structure in which a pair of outer electrodes 104 (104a, 104b) are arranged on a pair of end surfaces 103 (103a, 103b) of a ceramic element body 110 having a plurality of inner electrodes 102 (102a, 102b) stacked with ceramic layers 101 serving as dielectric layers to be electrically connected to respective ones of the inner electrodes 102 (102a, 102b). The outer electrodes 104 (104a, 104b) include metal electrode layers 105 (105a, 105b) formed on the outer surfaces of the ceramic element body 110 and containing metal as the main constituent, and conductive resin layers 106 (106a, 106b) formed on the outer surfaces of the metal electrode layers 105 (105a, 105b) and containing resin as the main constituent.

Ni plated films 107 (107a, 107b) are formed on the surfaces of the outer electrodes 104 (104a, 104b), and Sn plated films 108 (108a, 108b) are formed on the surfaces of the Ni plated films 107 (107a, 107b).

Also, the metal electrode layers 105 (105a, 105b) are formed by applying conductive paste containing metal as the main constituent to the ceramic element body 110 and baking the conductive paste. The conductive resin layers 106 (106a, 106b) are formed by applying conductive resin paste containing resin as the main constituent to the ceramic element body 110 formed with the metal electrode layers 105 (105a, 105b), heating the conductive resin paste, and hence hardening resin in the conductive resin paste.

Japanese Unexamined Patent Application Publication No. 10-284343 describes that a product with stable quality and high reliability can be obtained by setting the extending length of the metal electrode layers forming the outer electrodes to be a proper ratio to the extending length of the conductive resin layers.

Figure 5:
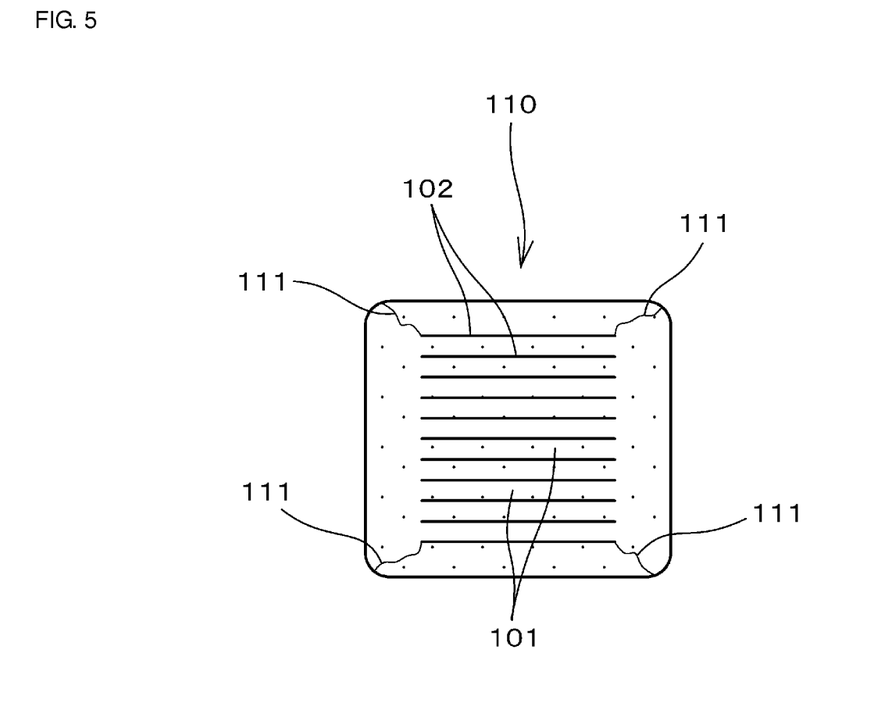
FIG. 5 is an illustration for describing a problem of the multilayer ceramic capacitor according to the related art.

However, in the case of the above-described multilayer ceramic capacitor, when the conductive paste for forming the metal electrode layers 105 is baked in a manufacturing process thereof, the inner electrodes 102 may expand in a stacking direction (thickness direction, height direction, or T direction) of the inner electrodes 102 and a width direction (direction orthogonal to a direction in which the inner electrodes extend or W direction) of the inner electrodes 102. Due to the expansion, for example, as schematically shown in FIG. 5, when viewed from the end surface 103 side of the ceramic element body 110, a crack 111 may be generated so as to extend from a corner portion of the effective region, in which the plurality of inner electrodes 102 are stacked through the ceramic layers 101 and which contribute to generation of capacitance, to a corner portion of the ceramic element body 110. Thus, reliability is decreased.

SUMMARY OF THE INVENTION

Accordingly, a preferred embodiment of the present invention provides a highly reliable multilayer ceramic capacitor that has a structure in which an outer electrode is arranged on a surface of a ceramic element body including an inner electrode and that restricts or prevents generation of a crack in the ceramic element body such as a crack caused by expansion of the inner electrode.

According to a preferred embodiment of the present invention, a multilayer ceramic capacitor includes a ceramic element body including a plurality of dielectric layers made of dielectric ceramic, and a plurality of inner electrodes stacked with the dielectric layers in a stacking direction, in which adjacent ones of the plurality of inner electrodes sandwiching one of the plurality of dielectric layers in the stacking direction alternately extend to a pair of mutually opposite end surfaces of the ceramic element body; and a pair of outer electrodes arranged on outer surfaces of the ceramic element body and electrically connected to respective ones of the inner electrodes. The outer electrodes include metal electrode layers arranged on the outer surfaces of the ceramic element body and containing metal, and conductive resin layers arranged on outer surfaces of the metal electrode layers and containing resin. When one of the plurality of dielectric layers present between a pair of the inner electrodes adjacent to each other in the stacking direction among the plurality of inner electrodes extending to one of the pair of end surfaces of the ceramic element body is an inter-electrode dielectric layer, a gap is provided in the inter-electrode dielectric layer and extends in a direction connecting the adjacent inner electrodes sandwiching the inter-electrode dielectric layer.

The gap may be preferably located at a position near or adjacent to at least the one of the pair of end surfaces of the ceramic element body, in about 5% or more, for example, of inter-electrode dielectric layers among the plurality of inter-electrode dielectric layers included in the ceramic element body.

The gap partially divides the ceramic element body in a direction connecting the pair of end surfaces.

Two or more gaps may be preferably present in the same inter-electrode dielectric layer.

Also, in a multilayer ceramic capacitor according to a preferred embodiment of the present invention, the gap may be preferably present in about 5% to about 90%, for example, of inter-electrode dielectric layers among the plurality of inter-electrode dielectric layers.

Also, in a multilayer ceramic capacitor according to a preferred embodiment of the present invention, a thickness of inter-electrode dielectric layer preferably is about 1.5 µm to about 4 µm, for example, at a position near or adjacent to at least one of the pair of end surfaces of the ceramic element body; and the gap preferably is located at a position within a distance of about 10 µm, for example, from at least one of the pair of the end surfaces of the ceramic element body.

Since the gap extends in the direction connecting the adjacent inner electrodes sandwiching the inter-electrode dielectric layer is present at the position near or adjacent to at least the one of the pair of end surfaces of the ceramic element body preferably in about 5% to about 90%, for example, of the inter-electrode dielectric layers among the plurality of inter-electrode dielectric layers, the inner electrodes easily expand in the length direction (L direction) of the ceramic element body, and expansion of the inner electrodes in the stacking direction (T direction) of the inner electrodes and the width direction (direction orthogonal to the direction in which the inner electrodes extend or W direction) of the inner electrodes is further reliably restricted or prevented. Accordingly, generation of a crack from a corner portion of the effective region, in which the inner electrodes adjacent to each other in the stacking direction are overlaid through the inter-electrode dielectric layers and which contributes to generation of capacitance, to a corner portion of the ceramic element body is reliably restricted or prevented.

A multilayer ceramic capacitor according to a preferred embodiment of the present invention includes a plurality of dielectric layers and a plurality of inner electrodes stacked with the dielectric layers, and includes a pair of outer electrodes electrically connected to the inner electrodes. The pair of outer electrodes are provided on a substantially rectangular-parallelepiped-shaped ceramic element body including a pair of mutually opposite end surfaces, to which the inner electrodes extend, and four side surfaces connecting the pair of end surfaces. When a dielectric layer present between a pair of inner electrodes adjacent to each other in the stacking direction among a plurality of inner electrodes extending to one of the pair of end surfaces of the ceramic element body is an inter-electrode dielectric layer, a gap extending in a direction connecting the adjacent inner electrodes sandwiching the inter-electrode dielectric layer is present at a position near or adjacent to at least the one of the pair of end surfaces of the ceramic element body, preferably in about 5% or more, for example, of inter-electrode dielectric layers among a plurality of the inter-electrode dielectric layers included in the ceramic element body. The gap partially divides the ceramic element body in the direction connecting the pair of end surfaces. Accordingly, expansion of the inner electrodes in the length direction (L direction) of the ceramic element body is able to be easily executed, and expansion of the inner electrodes in the stacking direction (T direction) of the inner electrodes and the width direction (direction orthogonal to the direction in which the inner electrodes extend or W direction) is restricted or prevented.

Consequently, generation of a crack from a corner portion of the effective region, in which the inner electrodes adjacent to each other in the stacking direction are overlaid through the inter-electrode dielectric layer and which contributes to generation of capacitance in the ceramic element body due to expansion of the inner electrodes in the WT directions (width direction and thickness direction) of the ceramic element body, is restricted or prevented, and hence a multilayer ceramic capacitor with high reliability is provided.

Also, in a preferred embodiment of the present invention, a conductive resin layer located on an outer surface of a metal electrode layer and containing resin as the main constituent is included, a phenomenon in which a plating solution enters the inside and a crack is generated is prevented from occurring. Also, since the entry of moisture with time is reliably prevented, resistance to moisture is improved. Further, even in a case that a glass component is present on the surface of the metal electrode layer, since the conductive resin layer is located on the outer surface of the metal electrode layer, the conductive resin layer provides good plate adhesion.

In a preferred embodiment of the present invention, the gap extending in the direction connecting the adjacent inner electrodes sandwiching the inter-electrode dielectric layer and partially dividing the ceramic element body in the direction connecting the pair of end surfaces may be preferably located in an end-surface near region near or adjacent to the end surface of the ceramic element body, preferably within about 10 μm, for example, from the end surface of the ceramic element body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are described below to further specifically describing features of the present invention.

Figure 1:
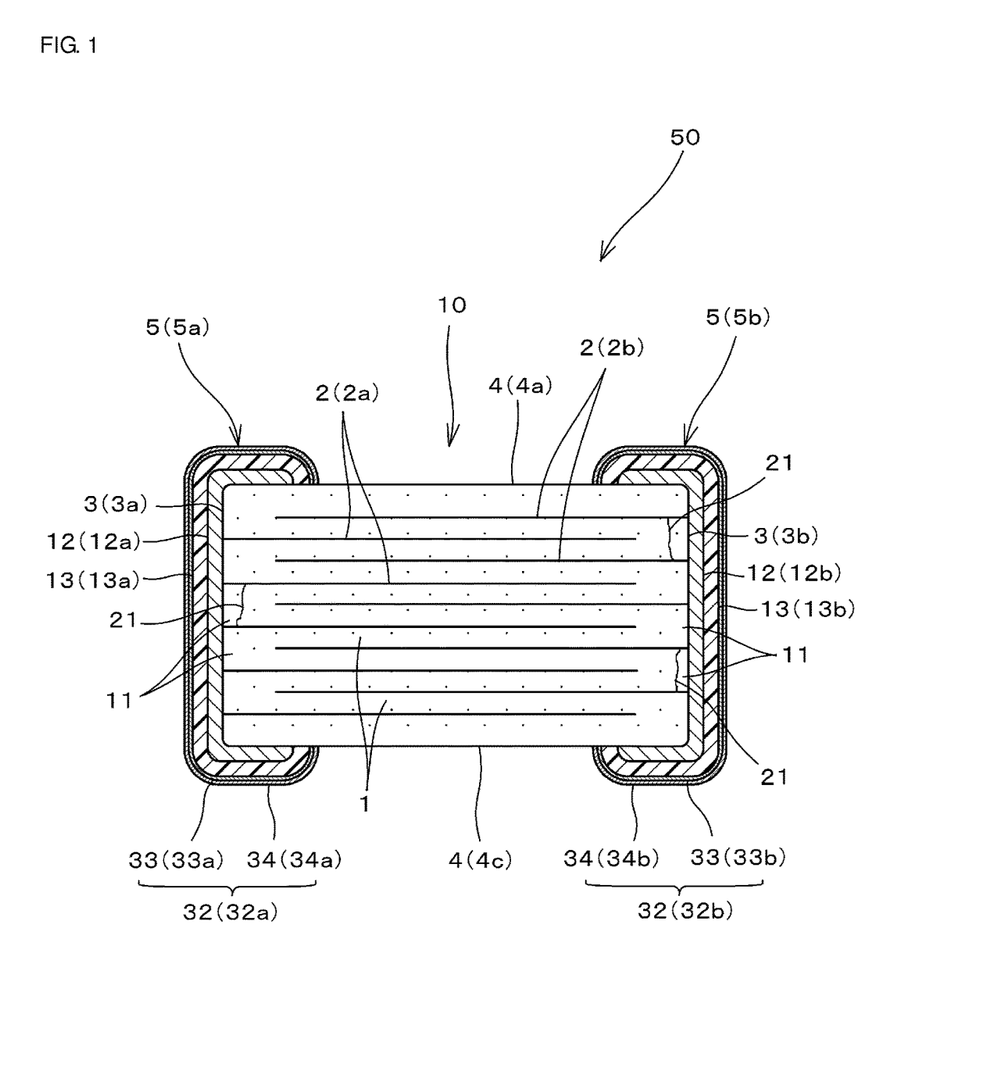
FIG. 1 is a front cross-sectional view showing a configuration of a multilayer ceramic capacitor according to a preferred embodiment of the present invention.
Figure 2:
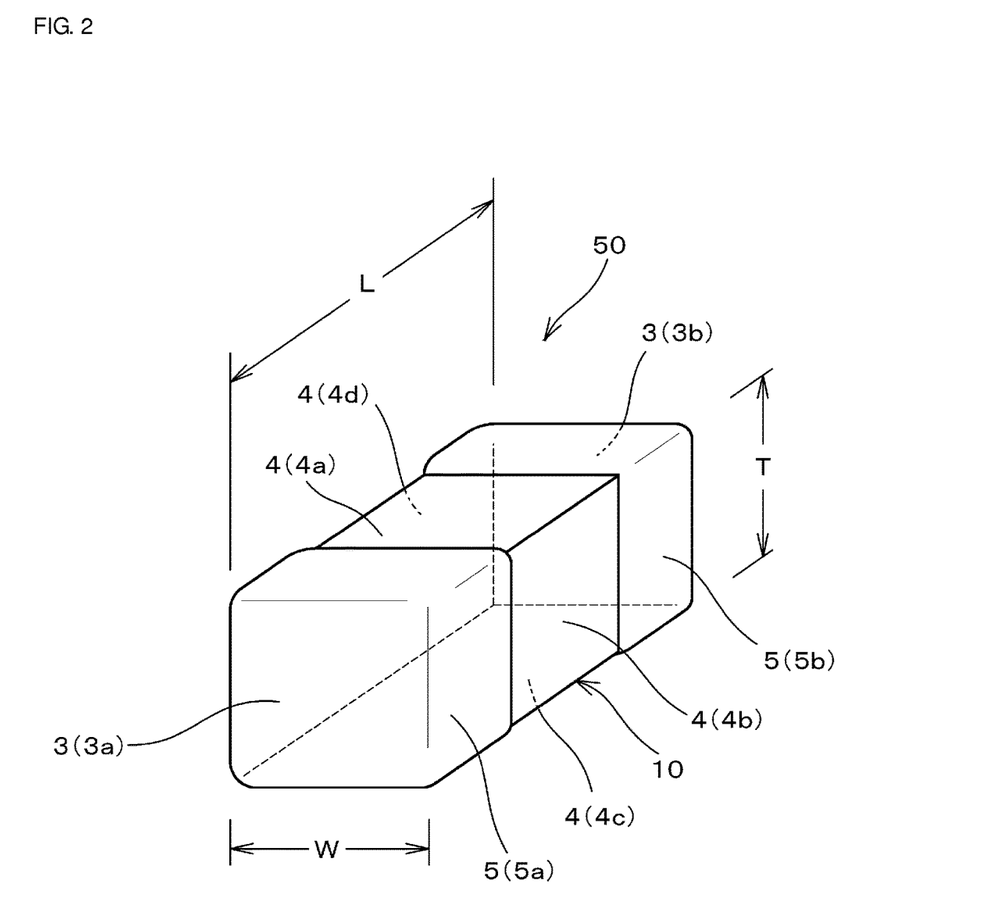
FIG. 2 is a perspective view showing an external configuration of a multilayer ceramic capacitor according to a preferred embodiment of the present invention.

FIG. 1 is a front cross-sectional view showing a configuration of a multilayer ceramic capacitor 50 according to a preferred embodiment (first preferred embodiment) of the present invention. FIG. 2 is a perspective view showing an external configuration of the multilayer ceramic capacitor 50.

The multilayer ceramic capacitor 50 includes a ceramic element body 10 including a dielectric layer 1 made of dielectric ceramic and a plurality of inner electrodes 2 (2a, 2b) stacked with the dielectric layer 1, and a pair of outer electrodes 5 (5a, 5b) arranged on outer surfaces of the ceramic element body 10 to be electrically connected to respective ones of the inner electrodes 2 (2a, 2b).

The outer electrodes 5 (5a, 5b) include metal electrode layers 12 (12a, 12b) provided on outer surfaces of the ceramic element body 10 and containing metal as the main constituent, and conductive resin layers 13 (13a, 13b) provided on outer surfaces of the metal electrode layers 12 (12a, 12b) and containing resin as the main constituent.

The ceramic element body 10 preferably has a substantially rectangular-parallelepiped shape and includes a pair of mutually opposite end surfaces 3 (3a, 3b), and four side surfaces 4 (4a, 4b, 4c, 4d) connecting the end surfaces 3a and 3b.

In the ceramic element body 10, the dielectric layer (ceramic layer) 1 and the inner electrodes 2 (2a, 2b) are alternately stacked. The inner electrodes 2 (2a, 2b) adjacent to each other in a stacking direction alternately extend to the opposite end surfaces 3 (3a, 3b).

The outer electrodes 5a and 5b each extend from the end surface 3 (3a, 3b) of the ceramic element body 10 to at least one of the side surfaces 4 (4a, 4b, 4c, 4d) (in this preferred embodiment, being configured to extend to all the four side surfaces 4a, 4b, 4c, and 4d). The metal electrode layers 12 (12a, 12b) are provided on the outer surfaces of the ceramic element body 10, and the conductive resin layers 13 (13a, 13b) preferably cover the metal electrode layers 12 (12a, 12b).

In this case, when it is assumed that a direction connecting the pair of end surfaces 3a and 3b of the ceramic element body 10 is a length L direction, a direction perpendicular or substantially perpendicular to the L direction and extending along a principal surface of the inner electrode 2 is a width W direction, and the stacking direction of the inner electrodes 2 is a height or thickness T direction, the following are non-limiting examples of dimensions for the ceramic element body 10 of the multilayer ceramic capacitor 50 according to this preferred embodiment:
(a) L: 2.0 mm, W: 1.2 mm, T: 1.2 mm
(b) L: 1.6 mm, W: 0.8 mm, T: 0.8 mm
(c) L: 1.0 mm, W: 0.5 mm, T: 0.5 mm
(d) L: 0.6 mm, W: 0.3 mm, T: 0.3 mm
(e) L: 0.4 mm, W: 0.2 mm, T: 0.2 mm Also, the ceramic element body 10 basically has the substantially rectangular-parallelepiped shape as described above. However, corner portions and ridge portions may be rounded with a predetermined curvature radius or smaller. The multilayer ceramic capacitor 50 according to this preferred embodiment also includes the ceramic element body 10, which is chamfered by barrel grinding.

The material forming the dielectric layer 1 includes dielectric ceramic containing, for example, $BaTiO_3$, $CaTiO_3$, $SrTiO_3$, or $CaZrO_3$ as the main constituent. Alternatively, the material forming the dielectric layer 1 may include a material in which a Mn compound, a Co compound, a Si compound, or a rare-earth compound is added as a sub-constituent to the above-described main constituent.

The adjacent inner electrodes 2 (2a, 2b) sandwiching the dielectric layer 1 alternately extend to the opposite end surfaces 3 (3a, 3b) as described above. One inner electrode 2a is connected to the outer electrode 5a located at one end surface 3a side of the ceramic element body 10, and the other inner electrode 2b is connected to the outer electrode 5b located at the other end surface 3b side of the ceramic element body 10.

The material of the inner electrodes 2 (2a, 2b) may include a metal, such as Ni, Cu, Ag, Pd, or Au, or an alloy containing at least one kind of these metals, for example, an alloy of Ag and Pd. In this preferred embodiment, Ni is used for the forming material of the inner electrode.

Also, a stray inner conductor which is not electrically connected to the outer electrode may be provided on a farther outer side portion of the inner electrode arranged at the outermost side portion. In this case, the stray inner conductor may be made of the same material as the material of the inner electrode. If the stray inner conductor is provided, the stray inner conductor prevents moisture from entering the ceramic element body from the outside of the ceramic element body and hence improves resistance to moisture.

Also, the outer electrodes 5 (5a, 5b) include the metal electrode layers 12 (12a, 12b) located on the ceramic element body 10 and containing Cu as the main constituent and glass, the conductive resin layers 13 (13a, 13b) arranged to cover the metal electrode layers 12 (12a, 12b) and containing thermosetting resin as the main constituent and metal particles, and plated layers 32 (32a, 32b) arranged to cover the conductive resin layers 13 (13a, 13b).

Also, the plated layers 32 (32a, 32b) preferably are plated layers having a two-layer structure including Ni-plated layers 33 (33a, 33b) located on the conductive resin layers 13 (13a, 13b), and Sn-plated layers 34 (34a, 34b) located on the Ni-plated layers 33 (33a, 33b).

The Ni-plated layers 33 (33a, 33b) define and function as barrier layers that provide a barrier against solder during mounting.

The Sn-plated layers 34 (34a, 34b) are provided to ensure wettability with respect to the solder during mounting.

Figure 3:
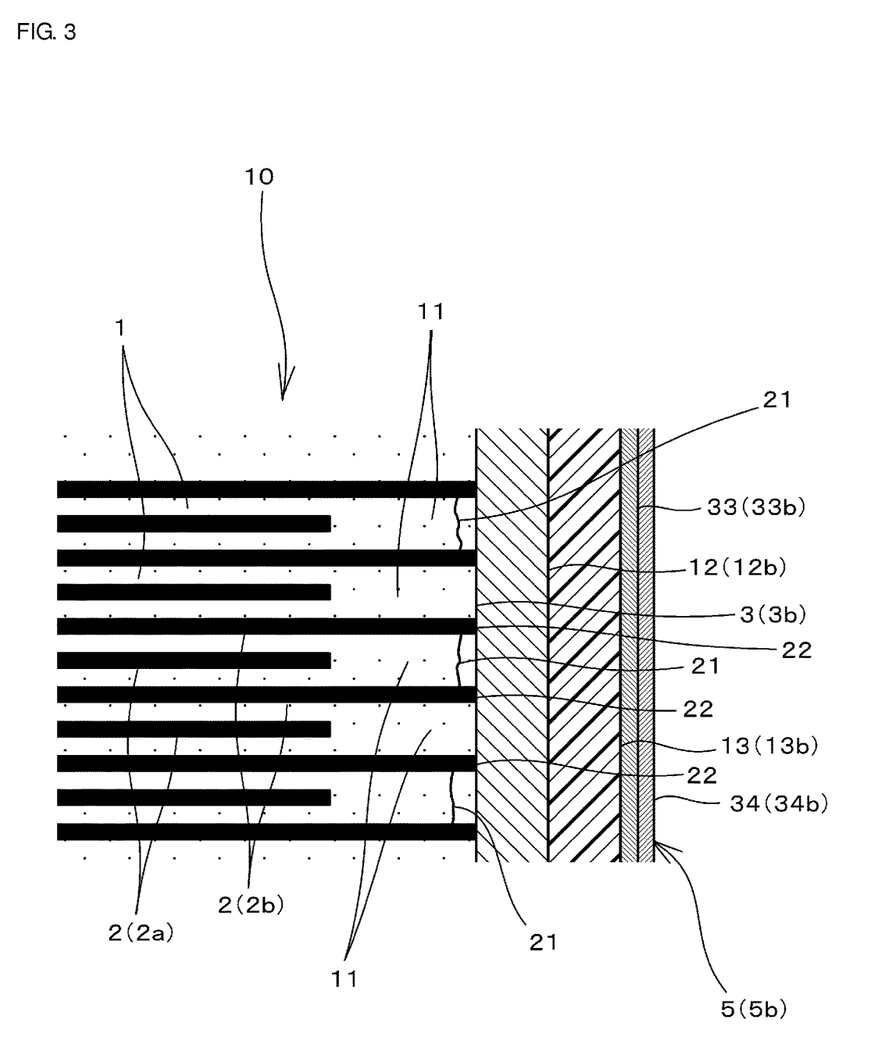
FIG. 3 is a cross-sectional view showing a primary portion of a multilayer ceramic capacitor in an enlarged manner according to a preferred embodiment of the present invention, in addition to FIG. 1.

In the multilayer ceramic capacitor 50, as shown in FIGS. 1 and 3, when a dielectric layer present between a pair of inner electrodes 2a and 2a, or 2b and 2b adjacent to each other in the stacking direction among a plurality of inner electrodes extending to one of the pair of end surfaces (3a, 3b) of the ceramic element body 10 is an inter-electrode dielectric layer 11, a gap (hereinafter, also referred to as "gap in a direction connecting the inner electrodes") 21 is preferably provided and extends in a direction connecting the adjacent inner electrodes 2a and 2a, or 2b and 2b sandwiching the inter-electrode dielectric layer 11.

The gap 21 is preferably present at a position near or adjacent to at least one of the pair of end surfaces 3a and 3b of the ceramic element body 10.

The gap 21 is preferably present in about 5% or more, for example, of inter-electrode dielectric layers 11 among a plurality of the inter-electrode dielectric layers 11 included in the ceramic element body 10. The gap 21 completely or at least partially divides the ceramic element body 10 at a cross section of the ceramic element body 10.

In many cases, the gap 21 is arranged in parallel or substantially parallel to the end surface of the ceramic element body 10.

However, the gap 21 does not have to be linear, and may be bent or curved.

Figure 6A:
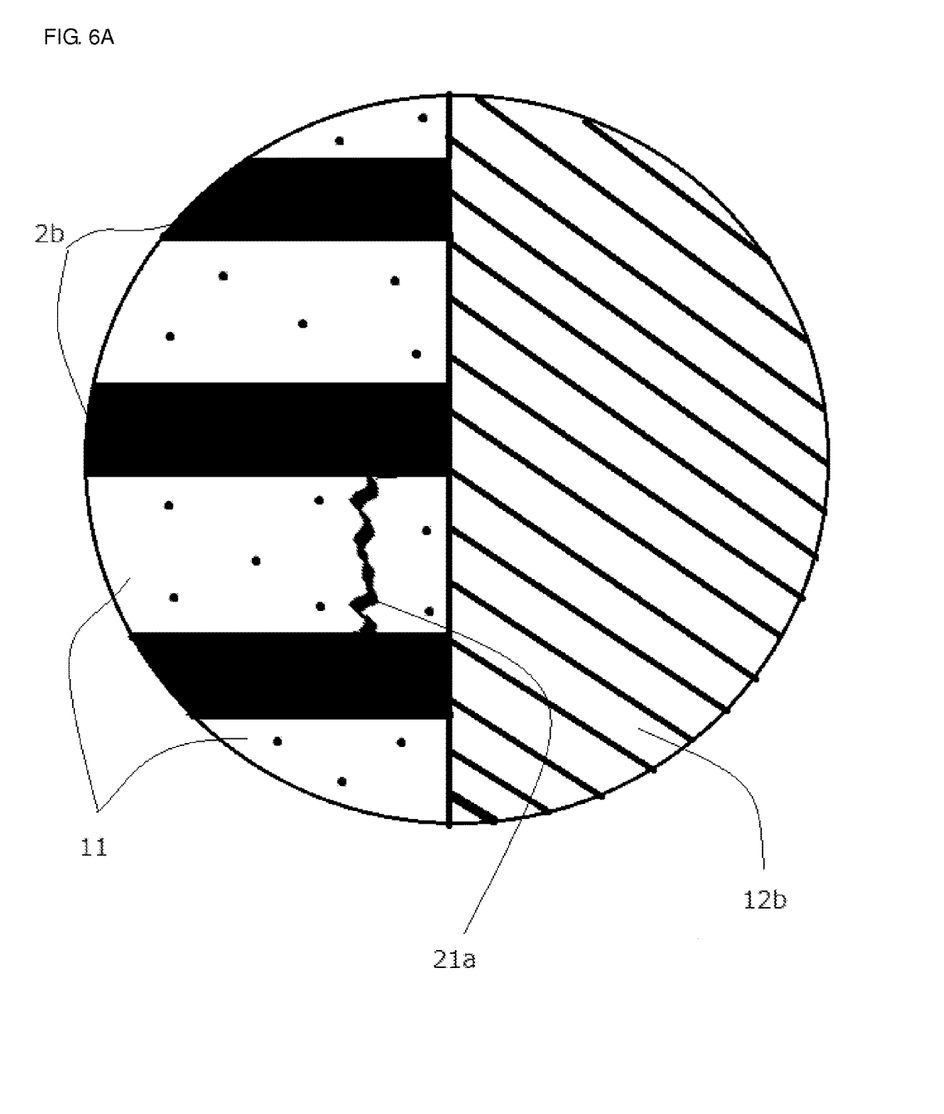
FIGS. 6A-6C are enlarged views of various portions of FIG. 3.

In one configuration of a gap 21a shown in FIGS. 3 and 6A, the gap 21a preferably extends continuously in the direction connecting the adjacent inner electrodes 2a and 2a or connecting the adjacent inner electrodes 2b and 2b, such that the gap 21a passes entirely through the inter-electrode dielectric layer 11 located therebetween. In other words, the inter-electrode dielectric layer 11 is completely separated by the gap 21a extending entirely through the inter-electrode dielectric layer 11 so that the inter-electrode dielectric layer 11 is divided into a left portion and a right portion separated from each other at a cross section of the ceramic element body 10 as seen in FIGS. 3 and 6A.

Figure 6B:
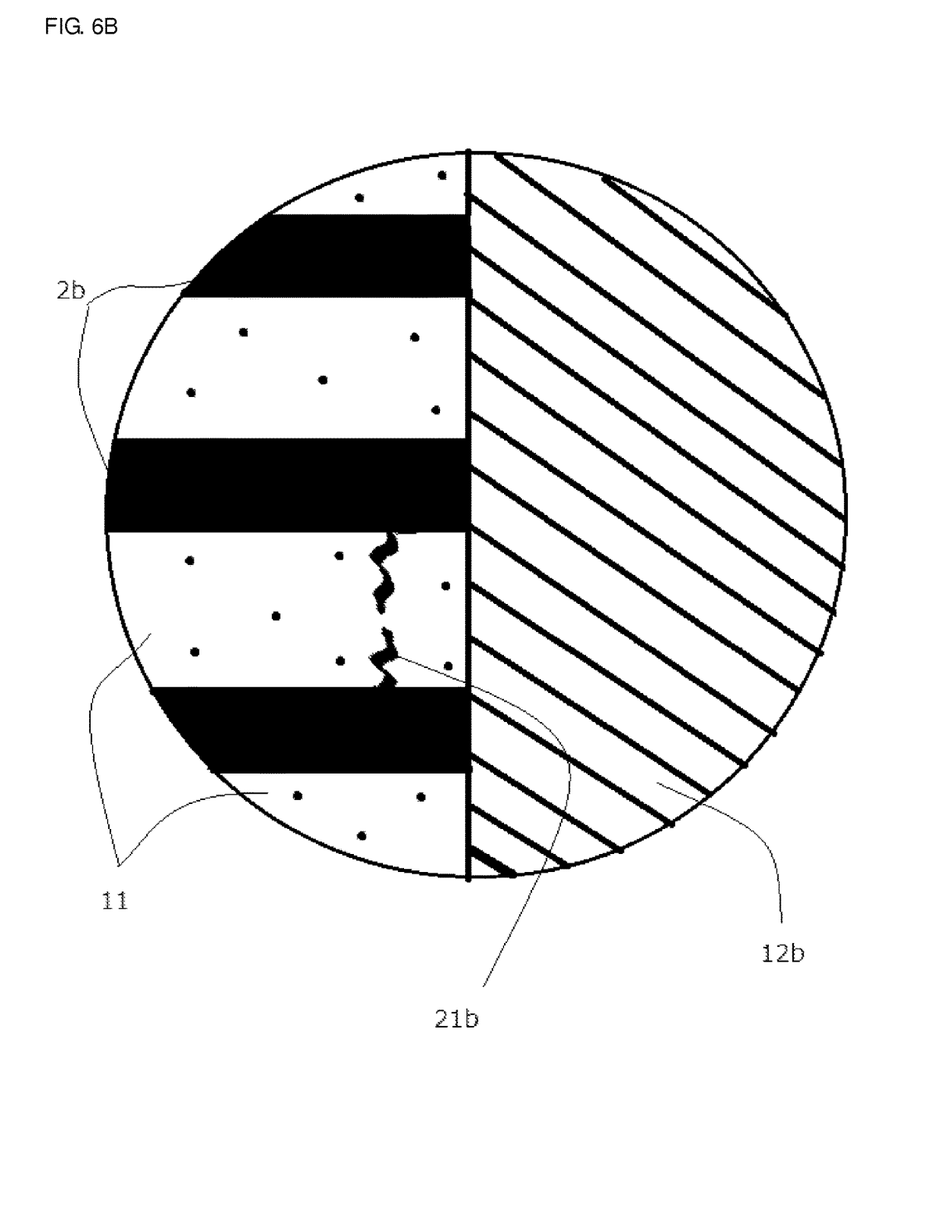

However, the gap 21 may not necessarily continuously extend between the adjacent inner electrodes 2a and 2a or between the adjacent inner electrodes 2b and 2b, and another configuration of the gap 21b shown in FIGS. 3 and 6B may be disconnected or interrupted in this area. In other words, the inter-electrode dielectric layer 11 is only partially separated by the gap 21b extending only partially and discontinuously through the inter-electrode dielectric layer 11 along the direction connecting the inner electrodes 2a or 2b sandwiching the inter-electrode dielectric layer 11 at a cross section of the ceramic element body 10.

Figure 6C:
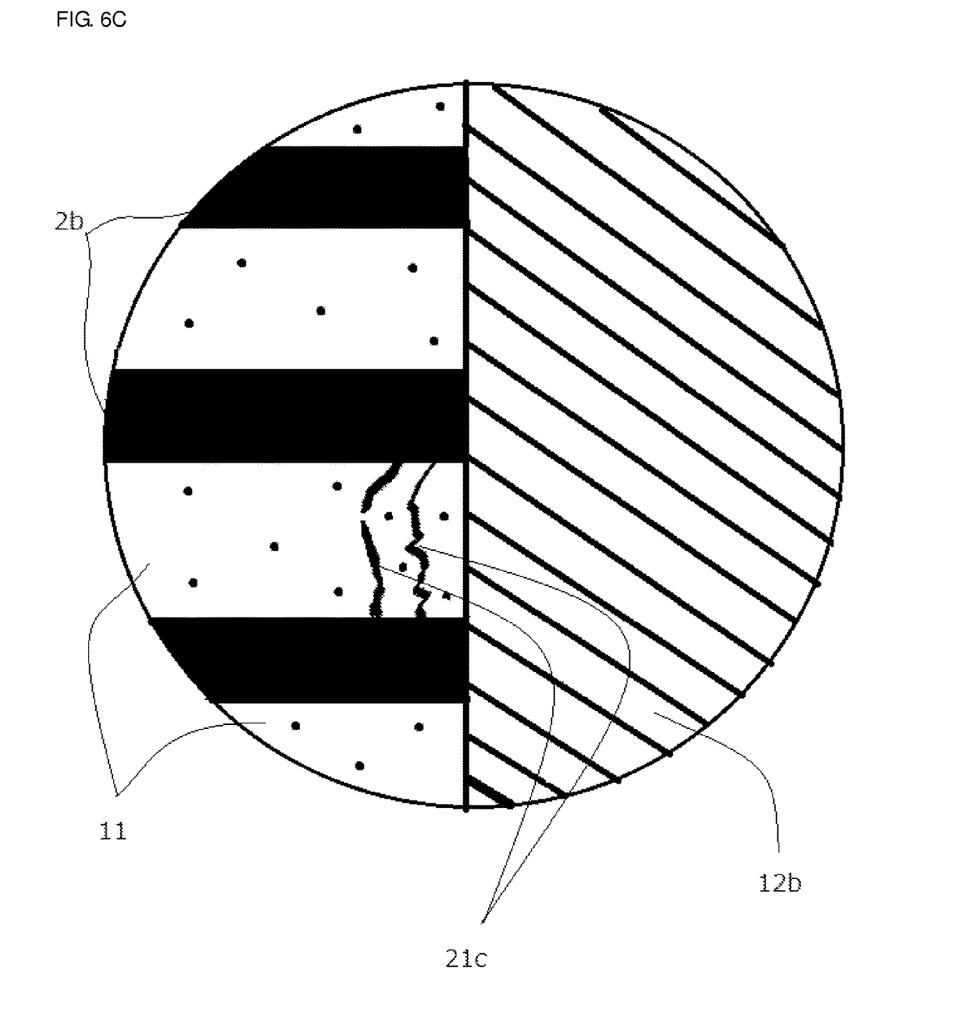

It is possible that more than one gap 21a or 21b is provided and present in the same inter-electrode dielectric layer 11 as shown in FIG. 6C at a cross section of the ceramic element body 10.

The gap 21 may be filled with air or a material of the inner electrodes 2 or outer electrodes 5, for example, Ni or a Ni—Cu alloy, for example.

The gap 21 preferably has a dimension extending in the length L direction (e.g., a direction perpendicular or substantially perpendicular to the direction connecting the inner electrodes 2a or 2b sandwiching the inter-electrode dielectric layer or along a length of the inter-electrode dielectric layer 11). The width of the gap 21 preferably is not less than about 0.2 μm and not more than about 2 μm, for example.

In the present preferred embodiment of the present invention, about 5% or more, for example, of the inter-electrode dielectric layers among the plurality of inter-electrode dielectric layers 11 preferably include the gap 21, and about 5% to about 90%, for example, of the inter-electrode dielectric layers further preferably include the gap 21.

Also, the gap 21 in the direction connecting the adjacent inner electrodes 2 sandwiching the inter-electrode dielectric layer 11 is preferably located in an end-surface near region near or adjacent to the end surface of the ceramic element body 10, within about 10 μm, for example, from the end surface of the ceramic element body 10.

In the multilayer ceramic capacitor 50 in this preferred embodiment having the above-described configuration, since the gap 21 in the direction connecting the inner electrodes 2 is provided in the inter-electrode dielectric layer 11, the inner electrodes 2 is able to easily expand in the length direction (L direction) of the ceramic element body 10. Hence, expansion of the inner electrodes 2 in the stacking direction (T direction) and the width direction (direction perpendicular or substantially perpendicular to the direction in which the inner electrodes 2 extend or W direction) is restricted or prevented.

In the multilayer ceramic capacitor of the related art, a crack is generated from a corner portion of the effective region, in which the plurality of inner electrodes are overlaid through the ceramic layer and which contributes to generation of capacitance, to a corner portion of the ceramic element body due to expansion of the inner electrodes in the WT directions (width direction and thickness direction) of the ceramic element body. In contrast, in the present preferred embodiment of the present invention, such a crack is reliably prevented from being generated.

Next, a non-limiting example of a manufacturing method of this multilayer ceramic capacitor 50 is described.

First, a ceramic green sheet is manufactured by applying ceramic raw-material slurry containing ceramic powder in a substantially sheet-shaped configuration by die coating, gravure coating, or microgravure coating, and drying the ceramic raw-material slurry.

Then, conductive paste for forming the inner electrodes containing Ni powder as a conductive component is applied on a predetermined ceramic green sheet among a plurality of the manufactured ceramic green sheets in a predetermined pattern by screen printing, inkjet printing, or gravure printing, and hence an inner electrode pattern is formed.

Then, the ceramic green sheet with the inner electrode pattern formed and the ceramic green sheet without the inner electrode pattern (ceramic green sheet for outer layer) are stacked by a predetermined number of sheets in a predetermined order.

Then, the obtained multilayer block is pressed, and the respective ceramic green sheets are press-bonded by pressure bonding. When the multilayer block is pressed, for example, a block to be press-bonded is sandwiched between resin films, and is pressed by a method such as isostatic pressing.

Then, the pressed multilayer press-bonded body is divided into substantially rectangular-parallelepiped-shaped chips (individual pieces) by using a method, such as press-cutting or cutting, and the chips are grinded by barrel grinding. The curvature radius of a corner portion and a ridge portion of each chip is preferably smaller than about 15 μm, for example.

The chips after the barrel grinding (individual pieces that become ceramic element bodies 10 (FIG. 1) after calcination) are heated at a predetermined temperature and a binder is removed. Then, for example, final calcination at about 900° C. to about 1300° C. is executed, and substantially rectangular-parallelepiped-shaped ceramic element bodies are obtained.

Then, conductive paste containing Cu powder being non-precious metal as a conductive component is applied to both end surfaces of each ceramic element body (conductive paste that becomes a metal electrode layer forming an outer electrode after calcination).

When the conductive paste is applied, one end surface of the ceramic element body is immersed in the conductive paste and raised while the other end surface of the ceramic element body is held by a holding jig, and hence the conductive paste is applied to the one end surface of the ceramic element body. Similarly, the conductive paste is applied to the other end surface of the ceramic element body.

At this time, the conductive paste may use, for example, conductive paste containing substantially spherical glass frits, substantially flat-shaped metal particles, a binder, and a solvent.

Then, the conductive paste applied to the one end portion and the other end portion of the ceramic element body as described above is heated at, for example, about 700° C., and the conductive paste is baked. Accordingly, the metal electrode layer is formed.

Alternatively, by applying the conductive paste to the chip (non-calcined chip) after the barrel grinding, and then calcining the chip, the sintering of the ceramic element body and the baking of the conductive paste may be simultaneously executed, and the sintered ceramic element body with the metal electrode layer may be formed.

Meanwhile, in a process of baking the conductive paste for forming the metal electrode layer, Cu in the metal electrode layer and Ni in the inner electrode are mutually diffused, and if the diffusion amount has the relationship of Cu>Ni, the volume of the inner electrode expands.

Then, when the expansion of the inner electrode progresses in the outer-electrode direction (L direction), and the stress caused by the expansion exceeds the intensity of the dielectric layer made of dielectric ceramic, a gap is generated in the dielectric layer. Then, as shown in FIGS. 1 and 3, the gap becomes the gap 21 in the direction connecting the adjacent inner electrodes 2a and 2a (or 2b and 2b) sandwiching the inter-electrode dielectric layer 11, the gap being generated at a position near or adjacent to at least one of the pair of end surfaces 3a and 3b of the ceramic element body 10, in the inter-electrode dielectric layer 11 present between the pair of inner electrodes adjacent to each other in the stacking direction, among the plurality of inner electrodes extending to the one of the pair of end surfaces of the ceramic element body.

In this case, if the gap 21 is generated in the direction connecting the inner electrodes 2a and 2a (or 2b and 2b) adjacent to each other in the stacking direction among the plurality of inner electrodes 2 extending to the one of the pair of end surfaces 3 of the ceramic element body 10, expansion of the inner electrodes 2a and 2b is likely generated in the length direction (L direction) of the ceramic element body, and expansion in the width direction (W direction) and the height direction (T direction) is restricted or prevented by the amount of the expansion in the length direction (L direction). However, the gap 21 may possibly cause deterioration in reliability, and hence excessive generation of the gap 21 is required to be restricted or prevented.

As a method of causing the gap 21 to be likely generated in the direction connecting the inner electrodes 2a and 2a (or 2b and 2b) adjacent to each other in the stacking direction, there is a method of using glass (highly reactive glass) of a kind that melts ceramic forming the dielectric layer and forms an amorphous layer or a crystal layer.

By reaction between the glass and ceramic, the ceramic becomes brittle (tensile strength and flexural strength are decreased), and the gap becomes likely generated.

The glass may be blended in the ceramic green sheet used to form the dielectric layer, or may be blended in the conductive paste for forming the outer electrode.

Also, a physical method for making ceramic brittle may be used by previously adding a mechanical shock to the ceramic. As a method of adding a mechanical shock, there is exemplified a method of inserting round stones and chips in a cylindrical container and rotating the cylindrical container.

Then, conductive resin paste, which becomes the conductive resin layer after calcinations, containing thermosetting resin as the main constituent and containing metal powder as the conductive material is applied to both end surfaces of the ceramic element body formed with the metal electrode layer.

When the conductive resin paste is applied, one end surface of the ceramic element body formed with the metal electrode layer is immersed in conductive resin paste and raised while the other end surface of the ceramic element body formed with the metal electrode layer is held by a holding jig, and hence the conductive resin paste is applied to the one end surface of the ceramic element body. Similarly, the conductive resin paste is applied to the other end surface of the ceramic element body.

At this time, the conductive resin paste contains the thermosetting resin and the metal powder being the conductive material. The thermosetting resin is not particularly limited, and may use, for example, phenol resin, acrylic resin, silicone resin, epoxy resin, or polyimide resin.

The metal powder may use both first metal powder of Cu or Ag, and second metal powder of Ni or Sn being non-precious metal. The first metal powder may have any shape of a substantially spherical shape, a substantially fish-scale shape (flat shape), or other shape. The second metal powder may have any shape of a substantially spherical shape, a substantially fish-scale shape (flat shape), or other shape. The average grain diameter is preferably smaller than that of the first metal powder and preferably in a range from about 10 to about 50 nm, for example.

Then, the conductive resin paste applied to the one end portion and the other end portion of the ceramic element body as described above is heated at, for example, about 200° C., and the resin is hardened. Accordingly, the conductive resin layer is formed. As described above, the conductive resin layer is formed to cover the metal electrode layer. At this time, the conductive resin layer may completely cover the metal electrode layer; however, a tip end of the extending portion of the metal electrode layer may be exposed from the conductive resin layer.

Then, plating is executed in the order of Ni plating and Sn plating on the conductive resin layer, and thus the Ni-plated layer and the Sn-plated layer are formed.

To be specific, for example, a plurality of ceramic element bodies provided with the conductive resin layers are housed in a barrel with a plating solution, and electricity is applied while the barrel is rotated. Accordingly, the Ni-plated layer is formed on the conductive resin layer, and similarly the Sn-plated layer is formed on the Ni-plated layer.

Accordingly, the multilayer ceramic capacitor 50 according to the present preferred embodiment of the present invention having the structure shown in FIGS. 1 to 3 is obtained.

In the ceramic capacitor 50, the gap 21 in the direction connecting the adjacent inner electrodes 2a and 2a, or 2b and 2b sandwiching the inter-electrode dielectric layer 11 is present at the position near or adjacent to at least one of the pair of end surfaces 3a and 3b of the ceramic element body 10, preferably in about 5% or more, for example, of the inter-electrode dielectric layers 11 among the plurality of inter-electrode dielectric layers 11. Accordingly, expansion of the inner electrodes 2 likely occurs in the length direction (L direction) of the ceramic element body, whereas expansion of the inner electrodes 2 in the width direction (W direction) and height direction (T direction) is restricted or prevented.

In the multilayer ceramic capacitor of the related art, a crack is generated from a corner portion of the effective region, in which the plurality of inner electrodes are overlaid through the dielectric layer and which contributes to generation of capacitance, to a corner portion of the ceramic element body due to expansion of the inner electrodes in the WT directions (width direction and thickness direction) of the ceramic element body. In contrast, in the present preferred embodiment of the present invention, such a crack is reliably prevented from being generated. Also, a multilayer ceramic capacitor with high reliability is obtained.

EXAMPLE

To confirm the advantageous effects of various preferred embodiments of the present invention, as described below, a multilayer ceramic capacitor (sample) according to a non-limiting example satisfying the requirements of various preferred embodiments of the present invention and a multilayer ceramic capacitor (sample) according to a comparative example not satisfying the requirements of various preferred embodiments of the present invention were manufactured, and their characteristics were evaluated by measuring bending strength of each sample.

A Cu-metal electrode layer was formed on a ceramic element body including inner electrodes made of Ni and dielectric layers made of barium-titanate-based ceramic, a conductive resin layer was formed to cover the Cu-metal electrode layer, and then a Ni-plated layer and a Sn-plated layer were formed on the surface of the conductive resin layer.

The ceramic element body had a length L of 1.0 mm, a width W of 0.5 mm, and a height T of 0.5 mm.

Also, the distance between the inner electrodes adjacent to each other in the stacking direction (i.e., thickness of a dielectric layer) was 1.0 µm, and the thickness of an inner electrode was 1.0 µm. Further, the stacked number of inner electrodes was 350 layers.

Further, the maximum thicknesses of the extending portions of the metal electrode layer and conductive resin layer extending to a side surface of the ceramic element body were each 14 µm.

Also, the Ni-plated layer formed on the conductive resin layer had a thickness of 3 µm, and the Sn-plated layer also had a thickness of 3 µm.

The above-described conditions were common to the respective multilayer ceramic capacitors of the comparative example and the example.

Then, as the multilayer ceramic capacitor according to the example, as shown in FIGS. 1 and 3, multilayer ceramic capacitors (samples with sample numbers 1 to 7 in Table 1 satisfying the requirements of various preferred embodiments of the present invention) were manufactured. Each of the multilayer ceramic capacitors was configured such that, when a dielectric layer present between a pair of inner electrodes 2a and 2a, or 2b and 2b adjacent to each other in a stacking direction among a plurality of inner electrodes extending to one of a pair of end surfaces 3a, 3b of a ceramic element body 10 is an inter-electrode dielectric layer 11, a gap 21 in a direction connecting the adjacent inner electrodes 2a and 2a (or 2b and 2b) sandwiching the inter-electrode dielectric layer 11 is present in about 5% to about 100% of inter-electrode dielectric layers 11 among a plurality of inter-electrode dielectric layers 100 included in the ceramic element body 10.

Also, as the multilayer ceramic capacitor according to the comparative example, a multilayer ceramic capacitor not having the above-described gap 21 in any of inter-electrode dielectric layers 11 and not satisfying the requirements of various preferred embodiments of the present invention (a sample with sample number 8 in Table 1) was manufactured.

When each of the samples (the multilayer ceramic capacitors) with sample numbers 1 to 7 was manufactured, a ceramic element body in a phase after calcination and before formation of an outer electrode was mixed and rotated with round stones for a predetermined time in a cylindrical container, thus a mechanical shock was added to the ceramic element body, and hence the above-described gap 21 was generated. By controlling the rotating time of the cylindrical container, the generation rate of the gap 21 in a plurality of the inter-electrode dielectric layers 11 included in the ceramic element body 10 was controlled.

In the case of the sample according to the comparative example with the sample number 8 in Table 1 (the sample with no gap 21 generated), processing for promoting generation of the gap was not executed.

Then, for each sample manufactured as described above, the relationship between the generation rate of the gap 21 in the direction connecting the inner electrodes (see FIGS. 1 and 3) and the presence of a crack from a corner portion of the effective region, in which the inner electrodes adjacent to each other in the stacking direction are overlaid through the inter-electrode dielectric layer and which contributes to generation of capacitance, to a corner portion of the ceramic element body was studied.

The generation rate of the gap in the direction connecting the inner electrodes was obtained by a method described below.

Method of Measuring Generation Rate of Gap in Direction Connecting Inner Electrodes The sample after formation of the outer electrodes is grinded in parallel to a plane (LT plane) determined in the length direction (L direction) and the height direction (T direction) to a center portion in the width direction (W direction), and the exposed grinded surface is observed by a scanning electron microscope (SEM) with magnification of 3000 times.

Then, as schematically shown in FIG. 3, if the gap 21 in the direction connecting adjacent inner electrodes 2 is found in the inter-electrode dielectric layer 11 located between the inner electrodes 2 in the stacking direction, at a position (the end-surface near region of the ceramic element body 10) corresponding to a position retracted from a tip end portion 22 of the inner electrode 2 extending to the end surface 3 of the ceramic element body 10 by about 2 μm or larger, the gap is called "a gap in a direction connecting inner electrodes."

Also, as shown in FIG. 3, based on a number B of the inter-electrode dielectric layers 11 in which "the gap in the direction connecting the inner electrodes" 21 is generated, with respect to a number A of the inter-electrode dielectric layers 11 present in a field of view, the generation rate of gaps in the direction connecting the inner electrodes is obtained with Expression (1) as follows:

Generation rate (%) of gap in direction connecting inner electrodes=$(B/A)\times 100$     (1).

Also, the presence of a crack to a corner portion of the ceramic element body (a crack to a corner of the ceramic element body) from a corner portion of the effective region, in which the inner electrodes adjacent to each other in the stacking direction are overlaid through the inter-electrode dielectric layer and which contributes to generation of capacitance, was studied by a method described below.

The sample after formation of the outer electrodes is grinded in parallel to a plane (WT plane) determined in the width direction (W direction) and the height direction (T direction), to the effective region, in which the inner electrode extending to one end surface of the ceramic element body and the inner electrode extending to the other end surface of the ceramic element body are overlaid, and the exposed grinded end surface is observed by a metal microscope (magnification: 1000 times). Then, a sample in which a crack from a corner portion of the effective region with the inner electrodes overlaid to a corner portion of the ceramic element body 10 (a crack corresponding to the crack 111 in FIG. 5 describing the problem of the multilayer ceramic capacitor of the related art) was recognized, "present (x)" was determined for generation of "a crack to a corner of the ceramic element body," and for a sample in which generation of a crack was not recognized, "none (○)" was determined for generation of "a crack to a corner of the ceramic element body."

Also, for each sample, a reliability test was performed under conditions of 85° C., RH 85%, and 1 WV. Characteristics were checked when 1000 hours elapsed and when 2000 hours elapsed. A sample the characteristics of which have been satisfied until 1000 hours was evaluated as good (○), and a sample the characteristics of which have been satisfied until 2000 hours was evaluated as very good (◎).

Also, Table 1 shows the results of overall evaluation. According to the overall evaluation, a sample was determined as very good (◎) if generation of "a crack to a corner of the ceramic element body" was not recognized and the result of the reliability evaluation was very good (◎). A sample was determined as good (○) if generation of "a crack to a corner of the ceramic element body" was not recognized, but the result of the reliability evaluation was good (○).

Table 1 collectively shows the generation rate of a gap in the direction connecting the inner electrodes, presence of a crack to a corner of the ceramic element body, the result of the reliability evaluation, and the result of overall evaluation, studied as described above.

TABLE 1

| Sample No. | Gap generation rate in direction connecting adjacent inner electrodes | Presence of crack to corner portion | Reliability evaluation | Overall evaluation |
| --- | --- | --- | --- | --- |
| 1 | 5% | None (○) | ◎ | ◎ |
| 2 | 10% | None (○) | ◎ | ◎ |

TABLE 1-continued

| Sample No. | Gap generation rate in direction connecting adjacent inner electrodes | Presence of crack to corner portion | Reliability evaluation | Overall evaluation |
|---|---|---|---|---|
| 3 | 20% | None (○) | ◎ | ◎ |
| 4 | 50% | None (○) | ◎ | ◎ |
| 5 | 80% | None (○) | ◎ | ◎ |
| 6 | 90% | None (○) | ◎ | ◎ |
| 7 | 100% | None (○) | ○ | ○ |
| 8 | 0% | Present (X) | ◎ | X |

As shown in Table 1, in a case of the sample according to the comparative example with the sample number 8, in which the generation rate of a gap in the direction connecting the adjacent inner electrodes sandwiching the inter-electrode dielectric layer was 0%, generation of a crack to a corner of the ceramic element body was recognized, and hence it was ensured that the sample was not preferable.

In contrast, in a case of each of the multilayer ceramic capacitors (samples with the sample numbers 1 to 7), the generation rate of a gap in the direction connecting the adjacent inner electrodes sandwiching the inter-electrode dielectric layer was 5% or higher, generation of a crack to a corner of the ceramic element body was not recognized.

However, in a case of the sample with the sample number 7, being a sample with a 100% generation rate of a gap in the direction connecting the adjacent inner electrodes, it was recognized that the reliability evaluation tended to be lowered.

Consequently, it was discovered that the generation rate of a gap in the direction connecting the adjacent inner electrodes is preferably about 90% or lower, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
  a ceramic element body including:
    a plurality of dielectric layers made of dielectric ceramic; and
    a plurality of inner electrodes stacked with the dielectric layers in a stacking direction; wherein
    adjacent ones of the plurality of inner electrodes sandwiching one of the plurality of dielectric layers in the stacking direction alternately extend to a pair of mutually opposite end surfaces of the ceramic element body; and
  a pair of outer electrodes arranged on outer surfaces of the ceramic element body and electrically connected to respective ones of the inner electrodes; wherein
  the outer electrodes include:
    metal electrode layers arranged on the outer surfaces of the ceramic element body and containing metal; and
    conductive resin layers arranged on outer surfaces of the metal electrode layers and containing resin; wherein
  one of the plurality of dielectric layers present between a pair of the inner electrodes adjacent to each other in the stacking direction among the plurality of inner electrodes extending to one of the pair of end surfaces of the ceramic element body is an inter-electrode dielectric layer;
  a gap is provided in the inter-electrode dielectric layer and extends in a direction connecting the adjacent inner electrodes sandwiching the inter-electrode dielectric layer; and
  the gap is located at a position near or adjacent to at least the one of the pair of end surfaces of the ceramic element body, and the gap at least partially divides the ceramic element body in a direction connecting the pair of end surfaces.

2. The multilayer ceramic capacitor according to claim 1, wherein the gap is located at the portion near or adjacent to at least one of the pair of end surfaces of the ceramic element body, in about 5% or more of inter-electrode dielectric layers among the plurality of inter-electrode dielectric layers included in the ceramic element body.

3. The multilayer ceramic capacitor according to claim 2, wherein the gap at least partially divides the ceramic element body in the direction connecting the pair of end surfaces.

4. The multilayer ceramic capacitor according to claim 2, wherein two or more gaps are present in the same inter-electrode dielectric layer.

5. The multilayer ceramic capacitor according to claim 1, wherein the gap is present in about 5% to about 90% of inter-electrode dielectric layers among the plurality of inter-electrode dielectric layers.

6. The multilayer ceramic capacitor according to claim 5, wherein the gap at least partially divides the ceramic element body in the direction connecting the pair of end surfaces.

7. The multilayer ceramic capacitor according to claim 5, wherein
  a thickness of the inter-electrode dielectric layer is about 1.5 μm to about 4 μm at a position near or adjacent to at least one of the pair of end surfaces of the ceramic element body; and
  the gap is located at a position within a distance of about 10 μm from at least one of the pair of the end surfaces of the ceramic element body.

8. The multilayer ceramic capacitor according to claim 5, wherein two or more gaps are present in the same inter-electrode dielectric layer.

9. The multilayer ceramic capacitor according to claim 7, wherein two or more gaps are present in the same inter-electrode dielectric layer.

10. The multilayer ceramic capacitor according to claim 1, wherein two or more gaps are present in the same inter-electrode dielectric layer.

11. The multilayer ceramic capacitor according to claim 1, wherein at least one of the internal electrodes is not connected to the outer electrodes.

12. The multilayer ceramic capacitor according to claim 1, wherein the external electrodes include plated layers located on the conductive resin layers.

13. The multilayer ceramic capacitor according to claim 12, wherein each of the plated layers includes a Ni plated layer on a respective one of the conductive resin layers, and an Sn plated layer on the Ni plated layer.

14. The multilayer ceramic capacitor according to claim 1, wherein the gap completely divides the inter-electrode dielectric layer into a first portion and a second portion completely separate from the first portion at a cross section of the ceramic element body.

15. The multilayer ceramic capacitor according to claim 1, wherein the gap is parallel or substantially parallel to at least the one of the pair of end surfaces of the ceramic element body.

16. The multilayer ceramic capacitor according to claim 1, wherein the gap has a shape that is one of linear, bent, and curved.

17. The multilayer ceramic capacitor according to claim 1, wherein the gap extends continuously through an entirety of the inner-electrode layer to completely separate the inner-electrode layer into a left portion and a right portion.

18. The multilayer ceramic capacitor according to claim 1, wherein the gap is filled with one of air, a material of the inner electrodes, and a material of the outer electrodes.

\* \* \* \* \*